United States Patent [19]
Hörmann

[11] Patent Number: 5,846,151
[45] Date of Patent: Dec. 8, 1998

[54] CONNECTION DEVICE FOR DRIVE MEANS POSSESSING PROFILE

[75] Inventor: Michael Hörmann, Halle/Westf., Germany

[73] Assignee: Marantec Antriebs-und Steuerungstechnik GmbH & Co. Productions KG, Marienfeld, Germany

[21] Appl. No.: 715,961

[22] Filed: Sep. 19, 1996

[30] Foreign Application Priority Data

Sep. 20, 1995 [DE] Germany .................. 195 34 932.6

[51] Int. Cl.$^6$ .................................................. F16G 3/00
[52] U.S. Cl. ................................. 474/253; 474/256
[58] Field of Search ............................. 474/253, 255, 474/256, 257

[56] References Cited

U.S. PATENT DOCUMENTS

| | | | |
|---|---|---|---|
| 4,254,666 | 3/1981 | Seredick | 474/253 |
| 4,298,343 | 11/1981 | Redmond, Jr. | 474/255 |
| 4,445,877 | 5/1984 | Love et al. | 474/255 |
| 4,540,389 | 9/1985 | Ramsey | 474/257 |
| 4,705,495 | 11/1987 | Madion | 474/255 |
| 4,721,497 | 1/1988 | Jager | 474/255 |
| 5,106,345 | 4/1992 | Moore et al. | 474/253 |
| 5,391,121 | 2/1995 | Schramm | 474/253 |
| 5,419,744 | 5/1995 | Kagebeck | 474/253 |

FOREIGN PATENT DOCUMENTS

9411333 U  12/1994  Germany .

OTHER PUBLICATIONS

Shuman, Timing Belt Termination, IBM Technical Disclosure Bulletin, vol. 2, No. 2, Jul. 1983.

*Primary Examiner*—John M. Jillions
*Assistant Examiner*—Emmanuel M. Marcelo
*Attorney, Agent, or Firm*—Dilworth & Barrese

[57] ABSTRACT

A connection device is provided for the receiving of at least one end of a drive device possessing profile, preferably of a toothed belt or a roller chain with the connection device possessing a negative form of the surface profile of the drive device with which the drive device meshes. In order to create a connection device for the connection by closure with a drive device possessing a profile which is simple to manufacture and easy to assemble, the end of the drive device can be joined with the connection device in accordance with the invention by a joining movement in the plane of the running surface of the drive means and in the longitudinal direction of the drive device profile.

15 Claims, 1 Drawing Sheet

5,846,151

CONNECTION DEVICE FOR DRIVE MEANS POSSESSING PROFILE

BACKGROUND OF THE INVENTION

The present invention relates to a connection device to receive at least one end of a drive means possessing profile, preferably a toothed belt or a roller chain, with the connection device possessing a negative form of the surface profile of the drive means which meshes with the drive means.

In cases where a toothed belt does not run in a loop in a toothed belt drive, but only transmits limited positioning movements, it may be meaningful to make the connection to a toothed belt or between two toothed belt ends by means of a toothed belt connector. Such a toothed belt connector must on the one hand provide a secure connection between the ends of a toothed belt, but on the other hand must be designed in such a way that the connection can be made and released again easily and fast.

A toothed belt connector of the generic type is known which consists of a symmetrical center piece and two sleeves. The center piece possesses a negative form of the surface profile of the toothed belt with which the toothed belt meshes. For assembly, the sleeves are first pushed over the ends of the toothed belt, then the toothed belt ends are inserted into the profile grooves of the center piece and, finally, the sleeves are pushed over the center piece for security.

However, such a toothed belt connector has the disadvantage that the manufacture is relatively complex and that the assembly comprises several assembly steps.

SUMMARY OF THE INVENTION

It is therefore the object of the present invention to provide a connection device for a positive connection with a drive means possessing profile which is easy to manufacture and simple to assemble.

Based on a connection device of the generic type this object is solved in accordance with the present invention by the end of the drive means being able to be joined together with the connection device by means of a joining movement in the plane of the running surface of the drive means and in the longitudinal direction of the drive means profile.

The invention has the advantage that the connection device in accordance with the invention is designed in one piece with minimal assembly effort and in simple exchangeability. In this way, manufacturing costs and assembly costs can be lowered while maintaining the reliability of the connection.

In particular, the connection device in accordance with the invention can be designed in such a way that by means of a joining movement both closure in the direction of pull and closure and/or force closure in the direction of join can be generated between the drive means and the connection device.

Preferably a toothed belt is provided as the drive means possessing profile.

In accordance with a preferred embodiment a stop is provided in the direction of join which stop defines the position of the toothed belt joined together with the connection device. This stop can comprise a continuous wall, individual bridges or also small protrusions. Preferably, at the opposite edge of the connection device narrow protrusions are also provided in the profile grooves. As the toothed belt possesses a certain elasticity, the belt teeth are pressed over these protrusions during joining. In the joined state the protrusions thus effect closure in the direction of joining with the opposite stop so that the toothed belt is secured in the direction of connection during operation. In order to release the toothed belt from the connection device again, boreholes are appropriately provided in the stop opposite the protrusions through which boreholes the toothed belt can be driven out of the connection device again by means of a suitable peg through at least one bore hole.

In place of the protrusions one or more catch springs can also be provided which secure the toothed belt in the connection device in the direction of joining. During joining these catch springs are to be pressed down by the belt teeth so that toothed belt and connection device can be joined together. Here, the catch springs can, for example, consist of a simple spring wire or also of the material used for the connection device.

In accordance with a preferred embodiment it is provided that the inside profile of the connection device is made in such a way that a true fit is created between connection device and toothed belt. Due to the friction between connection device and toothed belt, in this way force closure is created which can serve as the sole or also as an additional security of the toothed belt in the direction of joining.

In accordance with another preferred embodiment it is provided that the toothed belt is secured longitudinally to the join direction by material closure. The material closure connection can, for example, consist of a glue connection with the glue preferably being applied to the toothed belt prior to joining.

The connection device is preferably symmetrical in design so that two ends of a toothed belt are to be connected to each other. However, it is also feasible that the connection device is mounted on a fixed-position part and connects only one end of a toothed belt.

Depending on the application, the connection device can be, for example, of metal or plastic, preferably it is designed as an injection molded plastic.

BRIEF DESCRIPTION OF THE DRAWINGS

Further details and advantages of the invention are described in greater detail by means of one embodiment presented in the drawing, in which.

DESCRIPTION OF THE PREFERRED EMBODIMENT

Figure 1:
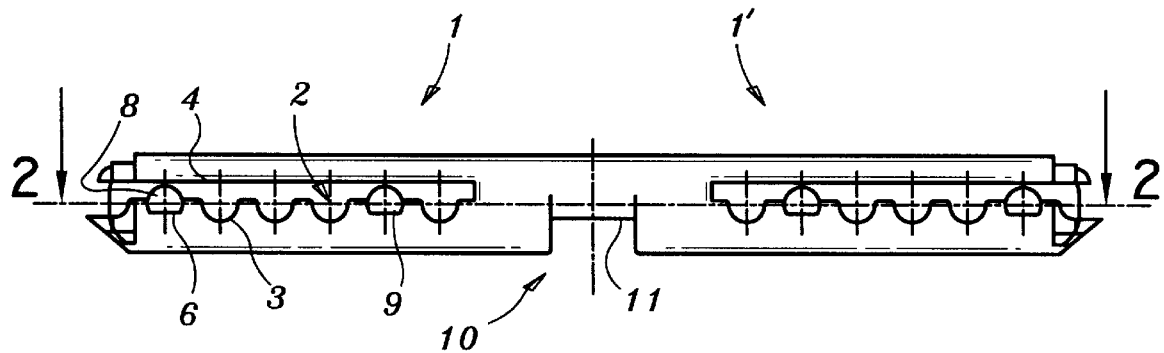
FIG. 1 shows a side view of a connection device, and FIG. 2 a longitudinal section through the connection device according to FIG. 1.

The connection device 10 shown in FIG. 1 is designed symmetrically and consists of the end parts 1 and 1' which are connected to each other via an intermediate part 11. The end parts 1 and 1' are each identical in design so that by means of the connection device 10 presented here the two ends of a toothed belt (not shown in detail in the drawing) can be connected.

The relevant end parts of the connection device 1 or 1' each possess slits 2 which form a negative form of the surface profile of the toothed belt to be received. Accordingly, on one side profile grooves 3 corresponding to the teeth of the toothed belt are scooped out while the opposite side possesses a smooth surface 4 corresponding to the surface of the toothed belt. Joining is now performed with the connection device 10 in the toothed belt (not shown in detail in FIGS. 1 and 2) by the belt teeth meshing with the profile grooves 3 and the smooth surface of the toothed belt sliding along on the smooth surface 4 and contacting accordingly in the assembled position.

Figure 2:
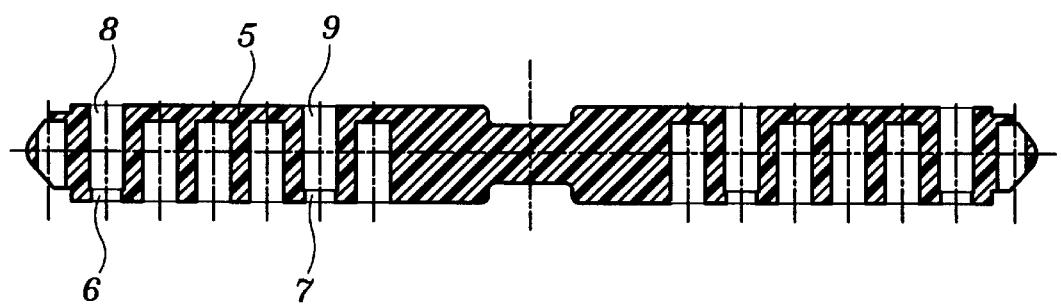

It can be seen from FIG. 2 that on the one edge of the profile grooves 3 a stop 5 in the form of a continuous wall is created. In this way, during the joining of toothed belt end and connection device 10 a correct insertion of the toothed belt is made easier by pushing this in up to contact with the stop 5. In the embodiment shown here, in the edge of the profile grooves opposite the stop, a protrusion 6 or 7 is provided in two of the profile grooves 3. These protrusions 6 or 7 protrude in the assembled position of the toothed belt only so far over the surface profile of the belt teeth that due to its elasticity the toothed belt can be pressed into the connection device by corresponding pressing. Opposite the protrusions two boreholes 8 and 9 flush with the profile grooves 3 are located in the wall in accordance with the embodiment described here.

The toothed belt can be joined with the connection device by a joining movement in the plane of the running surface of the toothed belt and in the direction of the belt teeth. Here, in the embodiment shown here a corresponding pressing force is required in order to overcome the resistances of the protrusions 6 and 7. In the joined state the toothed belt is secured in the direction of joining by closure on the one hand due to the stop 5 and on the other hand by the protrusions 6 and 7. In the direction of pull there also exists secure closure as the profile grooves 3 mesh with the surface profile of the toothed belt. The toothed belt can be released from the connection device 10 again by it being able to be driven out over the resistance of the protrusions 6 and 7 by means of two pegs (not shown in detail in the drawing) which are inserted into the boreholes 8 and 9.

Due to its comparatively simple design the connection device in accordance with the invention can be manufactured as a one-part injection molded plastic.

I claim:

1. A connection device for the receiving of at least one end of a drive means possessing profile, with the connection device possessing a negative form of a surface profile of the drive means and which meshes with the drive means, wherein said connection device is structured and arranged such that the end of the drive means can be joined with the connection device by a joining movement in a running surface of the drive means and in the longitudinal direction of the drive means profile, a stop is provided by means of which the position of the drive means profile joined together with the connection device can be fixed in position in the direction of joining, and the stop possesses at least one borehole which is substantially flush with one profile groove on whose end a narrow protrusion is formed so that the drive means can be driven out of the connection device again through at least one borehole.

2. A connection device in accordance with claim 1, wherein on an edge of at least one said profile groove of the connection device, said narrow protrusion is formed by means of which the drive means is pressable during joining and which, in the joined state, generates closure between the drive means and the connection device in the direction of joining.

3. A connection device in accordance with claim 2, wherein the drive means joined together with the connection device is secured by force closure longitudinally to the direction of joining.

4. A connection device in accordance with claim 2 comprising intermediate part and two end parts with each end part possessing said stop, at least one said profile groove, and at least one said narrow protrusion.

5. A connection device in accordance with claim 4, structured and arranged such that by said joining movement, closure in both directions of pull and join can be generated between said connection device and the drive means.

6. A connection device in accordance with claim 2, structured and arranged such that by said joining movement, closure in both directions of pull and join can be generated between said connection device and the drive means.

7. A connection device in accordance with claim 1, wherein the drive means joined together with the connection device is secured by force closure longitudinally to the direction of joining.

8. A connection device in accordance with claim 7, wherein the force closure is created by the friction of a true fit.

9. A connection device in accordance with claim 6, structured and arranged to generate the force closure to serve as the sole or additional security in the direction of joining.

10. A connection device in accordance with claim 1, comprising an intermediate part and two end parts.

11. A connection device in accordance with claim 1, comprising an intermediate part and two end parts, with each end part possessing said stop.

12. A connection device in accordance with claim 1, comprising an intermediate part and two end parts, with each end part comprising said stop, at least one said profile groove, at least one said narrow protrusion, and at least one said borehole.

13. A connection device in accordance with claim 12, structured and arranged such that by said joining movement, closure in both directions of pull and join can be generated between said connection device and the drive means.

14. A connection device in accordance with claim 1, structured and arranged such that by said joining movement, closure in both directions of pull and join can be generated between said connection device and the drive means.

15. A connection device in accordance with claim 1, formed as a one-part injection molded plastic.

* * * * *